April 5, 1932.  H. I. PIATT  1,852,261
FUEL CONTROL FOR HEATERS
Filed Dec. 5, 1927  3 Sheets-Sheet 3
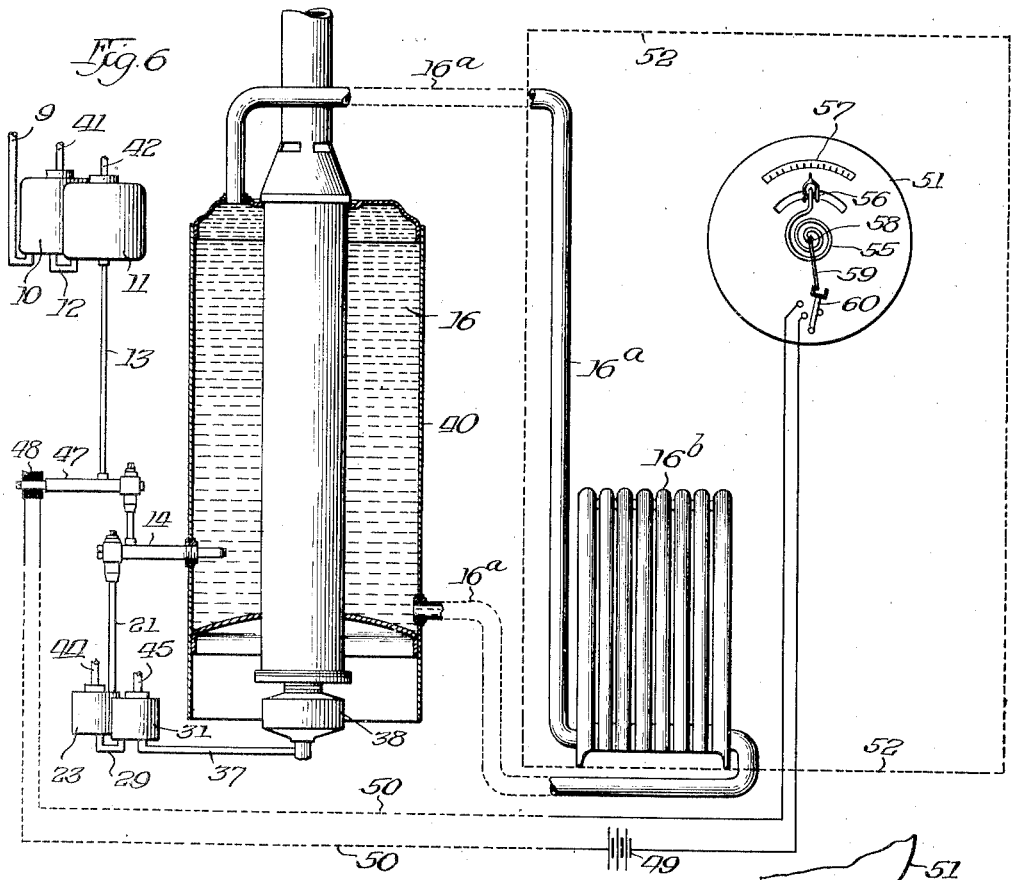
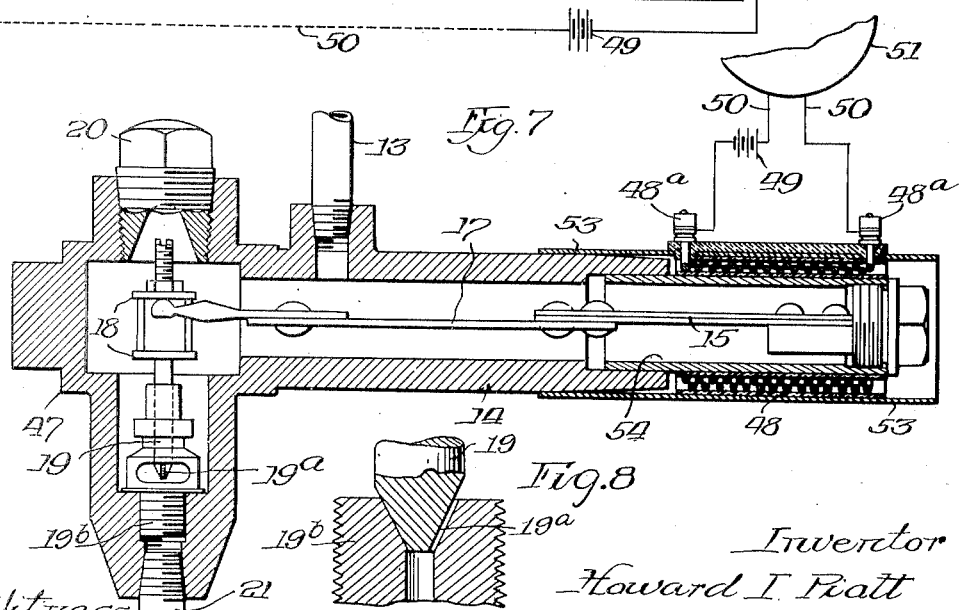
Inventor
Howard I. Piatt Patented Apr. 5, 1932

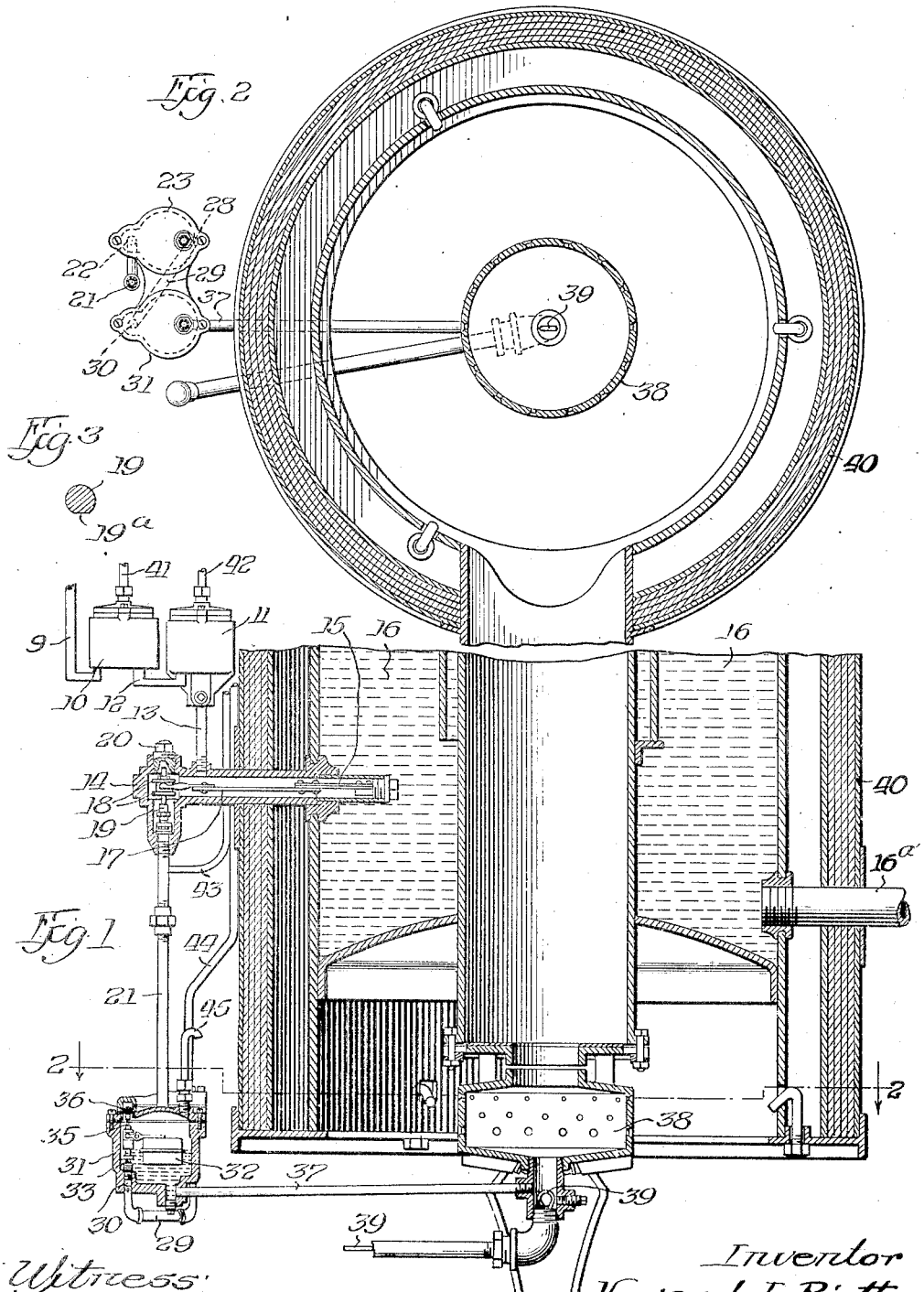

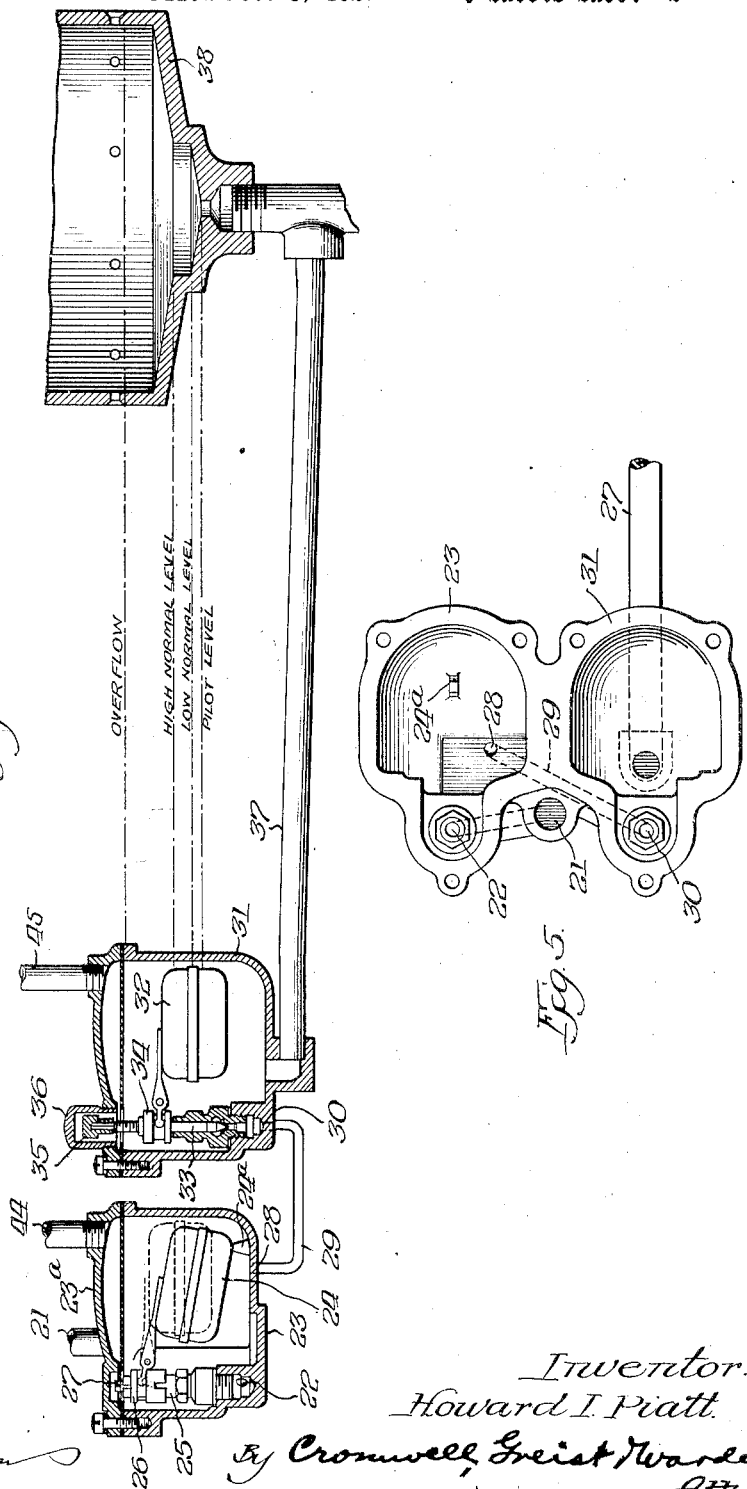

1,852,261

UNITED STATES PATENT OFFICE

HOWARD I. PIATT, OF LANSING, MICHIGAN, ASSIGNOR TO MOTOR WHEEL CORPORATION, OF LANSING, MICHIGAN, A CORPORATION OF MICHIGAN

FUEL CONTROL FOR HEATERS

Application filed December 5, 1927. Serial No. 237,957.

This invention, while illustrated and described in connection with heaters employing oil as a fuel, is likewise adapted generally for use in controlling the flow of liquids under head to maintain a predetermined pressure and level at the point of utilization.

A float device is in common use, as in connection with internal combustion engines, for controlling the amount of liquid fuel introduced to a carburetor or the like. It is known that when the float or its valve becomes logged or sticks or is otherwise impaired as to operation, the carburetor chamber floods and the whole assembly fails.

A failure of control as to pressure or level in a fuel feed to a burner is likely to result in an overflow of the fuel with the resultant danger of fire and other grave damage. It is therefore imperative that provision be made of a safeguard against disastrous results of a failure of the feed control.

I accomplish this primary object by a control device embodying a plurality of floats preferably arranged in series wherein certain of the floats function under normal conditions to maintain a constant head, certain of the others to maintain a predetermined level at the burner and certain of the others as a reserve to control the flow and establish a limit to the maximum level upon a failure of any other.

Associated with the multiple float control of the oil feed to a heater, I also thermostatically control the oil flow to the float chambers by a needle valve actuated by a thermostat, which thermostatic control is subject to the heat generated by the burner, whether the water of the boiler or the air of the room heated, or both, whereby I maintain not only the desired feed to the burner but regulate such feed to maintain the heat of the boiler and of the room within certain predetermined limits. This I accomplish, generally speaking, by a thermostat subject to the temperature of the water or other fluid heated by the burner. If the hot water itself is to be consumed for domestic or commercial uses, no other control of the burner than by the temperature of such water is required. If, however, the water or other fluid is employed as a circulatory medium for the heating of a room or other space, it is desirable that the burner also be subject to control by the room temperature.

For this conjoint control, I provide a second thermostat subject to such room temperature; the operation of the thermostats being independent of each other within predetermined maximum limits, and thereafter serving to the end that it shall not be possible to check one against the other—for a cool room to raise the temperature of the water beyond a safe maximum or for a cool boiler to raise the room temperature beyond a comfortable stage.

Moreover, it is often desirable to secure a constant reduced flow of fuel to supply a pilot flame even though the thermostats may have closed off the fuel to the heating flame. To meet this condition, at least one of the needle valves is provided on its operative face with a preferably flat area, which will permit the fuel to pass in sufficient quantity only to maintain the pilot; and to safeguard against an excess supply beyond the needs of the pilot, the reserve float is provided to cut off the supply when the level rises above the predetermined maximum.

The details of the burner and heater construction per se, shown herein for illustrative purposes, form no part of the present invention.

In order that the invention and its application to the purposes for which it is adapted may be readily understood, an embodiment of the same is hereinafter described as predicated upon illustrative drawings; it being understood that the drawings and description are for purposes of illustration and are not to be taken as limiting the invention beyond that necessitated by the prior art, modifications as to details and arrangement suited to varying needs being well within the skill of the engineer, following this disclosure.

In the drawings,

Fig. 1 is a fragmentary, vertical section through one form of water heater and the fuel control associated therewith;

Fig. 2 is a horizontal section on the line 2—2 of Fig. 1;

Fig. 3 is a fragmentary cross section of a needle valve point;

Fig. 4 is a diagrammatic sectional view illustrative of a duo-float level control;

Fig. 5 is a plan view of the duo-float level control with the cover and interior mechanism removed;

Fig. 6 is a schematic view of the invention embodied in a house-heating system;

Fig. 7 is an enlarged longitudinal section through the thermo-electric thermostat subject to remote control of the room temperature; and Fig. 8 is an enlarged sectional detail of the valve stem point and its seat.

Having reference first to Figs. 1 and 2 of the drawings, the fuel line from a supply tank not shown is indicated at 9 and interposed in that line are float chambers 10 and 11 for the purpose of maintaining a constant head at the level of the floats therein. These head control float chambers 10 and 11 are shown in elevation, rather than in section, the interior mechanism being that of the level control float chambers hereafter referred to and illustrated.

A pipe 12 leads from the outlet of chamber 10 to the inlet of chamber 11 while the outlet from the head-determining float chamber 11 leads by way of the pipe 13 to the interior of a tubular thermostat 14 which contains the bimetallic bar 15, the component parts of which react differently to changes in temperature, this thermostatic bar being mounted at one extreme end of the tubular chamber 14, which end is surrounded in the present case by the water 16 which is to be heated by the burner. An extension arm 17 has its forward extremity engaging between collars 18 forming a cage carried by the stem of a needle valve 19.

This needle valve controls the outlet port from the thermostat chamber and access to the said valve for regulation is provided through the removable screw plug 20. The upper end of the valve stem is provided with a kerf or it may be squared to permit the rotation of the same for adjustment, the shouldered portion 18 being screw threaded on the stem.

The operative point of some of the needle valves, herein illustrated in connection with the needle valve 19, is provided on its operative face with a surface which is preferably flattened as indicated at 19a and most clearly shown in Figs. 3 and 8, whereby even in its closed position enough fuel would be permitted to flow to the burner to supply a pilot flame.

The outlet port from the thermostat casing leads by way of a pipe 21 to the inlet port 22 of the level-determining float chamber 23 which houses a float 24 operatively connected to a needle valve 25 controlling the inlet port 22. The needle valve 25 is advantageously identical with and has the same relation to its seat as the needle valve 19 described above and illustrated in Figs. 3 and 8. The threaded engagement of the needle valve spindle with the collar member 26 permits the regulation of the position of this float to maintain a predetermined level by means of a slotted head 27 which is made accessible as required by the removal of the cover 23a. From the outlet port 28 of the first level-determining float chamber communication is established by the pipe 29 to the inlet port 30 of a second level-determining float chamber 31 which is a duplicate of the first with the exception that the connection between the float and the needle valve is set to operate at a level slightly below that of the float and valve in the first level-determining float chamber, the float of the second level-determining float chamber is designated by the reference character 32 and its needle valve by the reference numeral 33. The needle valve spindle, having threaded engagement with its collar member 34 is rotatable for adjustment by means of its knurled head 35, access being given by the removal of the threaded cap 36.

It will be understood that the multiple float control may be attained by a plurality of floats in one chamber or by a chamber housing each float as illustrated.

From the outlet port of the float chamber 31 a pipe line 37 leads to a burner 38 here shown as of the carburetor type, which burner, along with its cleaning element 39, and the heating boiler generally, illustrated at 40, form no part of the present invention and need not be further described in connection herewith.

The head control float chambers 10 and 11 are vented at 41 and 42. The feed pipe 21 between the thermostat-controlled needle valve and the level-determining float chambers is vented by means of a pipe 43, the upper end of which extends above the head-determining float chambers 10 and 11 and preferably above the level of the fuel supply. Similarly, the spaces above the floats in each of the level-determining float chambers 23 and 31 are vented by the pipes 44 and 45.

In accordance with the present invention I also provide a special arrangement, as diagrammatically illustrated in Fig. 6, for controlling the flow of the fuel to the burner 38, not only by the temperature conditions of the water 16 in the boiler 40 but also by the temperature conditions in the space that is to be heated by the boiler water 16 circulated through the pipes 16a and the radiator 16b. To this end there is interposed in the fuel line between the head control floats 10 and 11 and the burner 38 a dual thermostatic control mechanism actuated both by the temperature in the boiler and the temperature in the heated room to so vary the fuel flow as to maintain the temperatures in the two places within predetermined limits. The fuel flow control mechanism includes the boiler or locally controlled thermostat 14 and a remotely controlled thermostat 47. The valve of the two thermostats are arranged in series, the oil flowing first through the remotely controlled thermostat 47 and then through the boiler control thermostat 14. The boiler control valve and its operation has been described in detail in connection with Fig. 1.

The remote control thermostat 47 is shown in detail in Fig. 7 and is in every respect a duplicate of the boiler control thermostat 14 and its valve 19. However, in distinction from the latter the thermostat casing of the remote control does not project into the interior of the boiler 40, but is mounted outside thereof and is surrounded by a heater coil 48 to which, as shown in Fig. 6, current from a supply source, such as a battery 49, may be supplied by means of wires 50 from a remote control instrument 51 that may be disposed in the room 52 which is heated by the water 16 from the boiler 40. The heater coil is preferably constructed as a unit readily mountable over the thermostat end of the valve and includes a shell 53 fitting and adapted to be held on the outside of the tubular extension of the valve casing thermostat 14. The windings of the coil 48 are disposed inside the shell 53 between the inner walls thereof and the outer walls of a concentric inner housing 54 for the thermostatic fitting element 15, the two ends of the coil 48 leading to two binding posts 48a mounted on the outer shell 53. The coil 48 is heat insulated so that the heat generated by current flowing therethrough is directed toward the walls of the housing 54 and therethrough to the thermostat strip 15. By varying the heating current the position of the bimetallic strip 15 may be readily determined and therethrough the opening of the needle valve 19 controlled.

The remote control instrument 51 may be arranged to send through the heating coil 48 any desired type of control current depending on the kind of regulation desired, either continuous or step-by-step, or otherwise. In the exemplification shown in the drawings, the control instrument 51 is shown in the form of a room thermostat including a bimetallic spiral 55 having its outer end held clamped by means of an adjustably fixed clamping member 56 that is movable over a certain control range, the positions of the clamping member 56 being indicated by means of a temperature scale 57 with which a suitable pointer on the clamping member 56 cooperates. The inner end of the spiral 55 is secured to a rotatable spindle 58 which carries an actuating arm 59 by means of which a switch 60 may be thrown either to the left or to the right to close or open the energizing circuit for the heating coil 48.

When the temperature in the room 52 exceeds a predetermined value, the thermostat spiral 55 will throw the switch 60 to the left, closing the energizing circuit of the heating coil 48 and sending current therethrough. The heat generated by the coil will cause the bimetallic strip 15 to deflect downwardly and close the valve 19, thereby stopping the fuel flow to the burner 38. If the temperature in the room falls below a predetermined value, the thermostat spiral 55 throws the switch 60 to the right, opening the circuit to the heating coil 48. This cuts off the heat flow to the thermostat strip 15 in the valve, and, as a consequence, the valve opens, permitting flow of fuel to the burner 38.

In accordance with the present invention, the boiler control thermostat 14 and the remote control thermostat 47 are so cooperatively arranged as to assure flexible control of the room temperature while securing safety and reliability of boiler operation and efficiency of the heater system. It is of utmost importance to maintain the boiler temperature within predetermined limits since excessive boiler temperature may develop dangerous pressures, resulting in boiler explosions and danger to life and property. On the other hand, it is very important to permit ready control of the heater system so as to maintain any desired temperature in the room or space which is heated by the system. This dual control is obtained in a simple way by means of my invention in the following way: The thermostat element 15 in the boiler thermostat 14 is arranged to control the fuel flow through the valve 19 in response to the temperature conditions in the boiler with a view to maintaining the temperature thereof within limits at which its operation will be absolutely safe. This control will be continuous, that is, the valve will be open to a more or less degree depending on the rise of the boiler temperature above or below a predetermined desired operating value, and in general, the temperature of the boiler water will remain very close to the desired predetermined operating value, as fixed by the characteristics and setting of the boiler thermostat. The predetermined temperature maintained in the boiler water is so chosen that the circulation through the space that is to be heated, as the room 52, will tend to maintain the temperature of the same above or at the maximum value that may be required. The room thermostatic spiral 55, on the other hand, permits control of the remote control thermostat 47 so as to cut off or open the fuel flow to the burner in response to departure of the room temperature from any desired and readily changeable value, as determined by the setting of the room thermostat on the scale 57. In this way, irrespective of the action of the boiler thermostat 14, the fuel flow to the burner 38 will be cut off if the room temperature exceeds the value set on the thermostat instrument 55, or the fuel flow will be opened if the room temperature drops below said value, provided the boiler temperature is not above the safe maximum for which the boiler thermostat is set.

With the foregoing arrangement there is no danger of the boiler exceeding its safe operating temperature because, irrespective of the action of the room instrument 55, the thermostat 14 will control the boiler water temperature, giving thus a basic control of the system which will remain active throughout the entire time of the operation of the boiler. Should the room temperature, for instance, be below the desired value but the boiler temperature already have reached its maximum value, fuel flow to the burner will be prevented even if the room temperature control valve is open. Such condition will arise usually when the heater system is first set into operation, the water in the boiler having already reached its normal operating temperature but not being long enough in operation to bring the room temperature to the desired value. There is thus maintained a double control of the fuel, namely, a basic or primary control by the temperature in the boiler, and a superposed or secondary control by the temperature of the room that is to be heated.

In the preferred construction described hereinabove, the basic control is continuous, that is, there is a continuous regulation of the fuel flow, the valve opening more or less depending on the temperature of the boiler. On the other hand, the superposed control is intermittent or stepwise, the remote control valve either entirely shutting off the fuel flow and cutting out the regulating action of the boiler valve, or opening fully and restoring the continuous regulation of the boiler valve.

A distinct manufacturing advantage of the control arrangement of my invention is the use of the same type of thermostatic valve unit, both for the boiler control valve and for the remote control valve, a simple heating coil serving to transform the boiler control thermostatic valve for operation in response to the action of the remote control instrument 55. However, other known types of thermostatic valves may be employed for remote control.

As hereinbefore stated the invention is not limited to the particular details of construction and to the arrangements described and illustrated hereinabove, but is susceptible of many modifications that will now suggest themselves to those skilled in the art. For instance, it may be used with heaters operating with other fuel fluids, such as gas. It is accordingly desired that the appended claims be given a broad construction commensurate with the the scope of the invention within the art.

I claim:

1. A fluid fuel feed control comprising a fluid feed pipe line, a plurality of level-determining float chambers arranged in the feed line and having inlet and outlet ports, the outlet from one being in communication with the inlet to the next, a valve controlling each inlet port, a float disposed in each chamber and operatively connected to its valve to actuate the same at a predetermined level of fluid in the chamber, one float in a given chamber in the series being set to actuate its valve at a lower level than the float in another chamber, whereby under conditions of normal level at the point of consumption but one of the floats functions to actuate its valve and as the level rises above normal the other float comes into operation to close its valve, and means to regulate the position of the several floats independently whereby to determine the respective levels at which the valves will be actuated.

2. A fluid feed control comprising a plurality of level-determining float chambers arranged in the feed line and having inlet and outlet ports, the outlet from one being in communication with the inlet to the next, a valve controlling each inlet port, a float disposed in each chamber and operatively connected to its valve to actuate the same at a predetermined level of fluid in the chamber, one float in a given chamber in the series being set to actuate its valve at a lower level than the float in another chamber, whereby under conditions of normal level at the point of consumption but one of the floats functions to actuate its valve and as the level rises above normal the other float comes into operation to close its valve, and means to regulate the position of the several floats independently whereby to determine the respective levels at which the valves will be actuated, in combination with a head-determining float chamber disposed in the feed line and including float mechanism and a needle valve.

3. A fluid feed control comprising a plurality of level-determining float chambers arranged in the feed line and having inlet and outlet ports, the outlet from one being in communication with the inlet to the next, a valve controlling each inlet port, a float disposed in each chamber and operatively connected to its valve to actuate the same at a predetermined level of fluid in the chamber, one float in a given chamber in the series being set to actuate its valve at a lower level than the float in another chamber, whereby under conditions of normal level at the point of consumption but one of the floats functions to actuate its valve and as the level rises above normal the other float comes into operation to close its valve, means to regulate the position of the several floats independently whereby to determine the respective levels at which the valves will be actuated, in combination with a head-determining float chamber disposed in the feed line and including float mechanism and a needle valve, and vent pipes leading upwardly from the chamber spaces above the floats.

4. A fuel feed control comprising a set of head-determining float controlled valves and a set of level-determining float controlled valves arranged in series in the feed line, one of each set of floats being adjusted to actuate its valve in advance of the actuation of the valve of its companion float, whereby under normal conditions of operation but one float of each set functions to actuate its valve but under conditions deviating from normal as to head or level the other float of that set comes into operation to actuate its valve.

5. A fluid fuel feed control comprising a plurality of needle valves arranged in series in a feed line, level-determining floats acting upon certain of said valves, the operative face of one of the valves having a flattened area whereby when fully seated to maintain a reduced constant flow of fuel.

6. A fuel feed control comprising a set of head-determining float-controlled valves and a set of level-determining float-controlled valves arranged in series in the feed line, one of each set of floats being adjusted to actuate its valve in advance of the actuation of the valve of its companion float, whereby under normal conditions of operation but one float of each set functions to actuate its valve but under conditions deviating from normal as to head or level the other float of that set comes into operation to actuate its valve, and a valve in the feed line in advance of the level-determining float control valves arranged to seat imperfectly whereby to maintain when closed a reduced fuel flow.

7. A fuel feed control comprising a set of head-determining float controlled valves and a set of level-determining float controlled valves arranged in series in the feed line, one of each set of floats being adjusted to actuate its valve in advance of the actuation of the valve of its companion float, whereby under normal conditions of operation but one float of each set functions to actuate its valve but under conditions deviating from normal as to head or level the other float of that set comes into operation to actuate its valve, and a valve in the feed line in advance of the level-determining float controlled valves arranged to seat imperfectly whereby to maintain when closed a reduced fuel flow.

8. In a fuel feed control, a float arranged in the fuel line, a valve arranged to be operated by the float for regulating the flow of fuel, the valve having an area of its operative face out of contact with the valve seat whereby to maintain when fully closed a reduced flow.

9. In a fuel feed control, a plurality of floats arranged in series in the fuel line, a plurality of needle valves arranged to be operated one by each of the floats for regulating the flow of fuel, one of the valves having an area in its operative face out of contact with the valve seat whereby to maintain when fully closed a reduced flow.

10. A fluid fuel feed control comprising a plurality of float controlled valves arranged in series in a feed line and controlling the passage through the feed line, the advance valve in the series having an area of its operative face out of contact with the valve seat when the valve is closed, whereby to maintain a reduced constant flow independent of the floats.

In testimony whereof I have hereunto subscribed my name.

HOWARD I. PIATT.